June 24, 1930.  W. J. PETTY ET AL  1,767,894
COTTON GIN
Filed April 8, 1929   3 Sheets-Sheet 3

Fig.3.

W.J.Petty
E.M.Hancock, INVENTORS
BY Victor J. Evans
ATTORNEY

Patented June 24, 1930

1,767,894

UNITED STATES PATENT OFFICE

WILLIAM J. PETTY AND EUGENE M. HANCOCK, OF HOLLIS, OKLAHOMA

COTTON GIN

Application filed April 8, 1929. Serial No. 353,447.

This invention relates to improvements in cotton gins, the general object of the invention being to provide a casing or box covering the upper portions of the saws, with a roller arranged at the rear side of the box and containing grooves for receiving portions of the saws and acting to hold the seeds in the casing while permitting the passage of the lint; with a second grooved roller arranged at the front side of the box and through the grooves of which the saws pass, the second roller acting as a huller, with means for conveying the stripped seeds from the box or casing and means for controlling the inlet to said conveying means.

Another object of the invention is to arrange a reel in the hopper, the reel having projections thereon for feeding the material to the saws and to provide a conveyor within the reel for removing the hulls from the interior thereof.

A still further object of the invention is to provide conveying means for removing trash and the like from the bottom of the device.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 3 is a section on line 3—3 of Figure 1.

Figure 1:
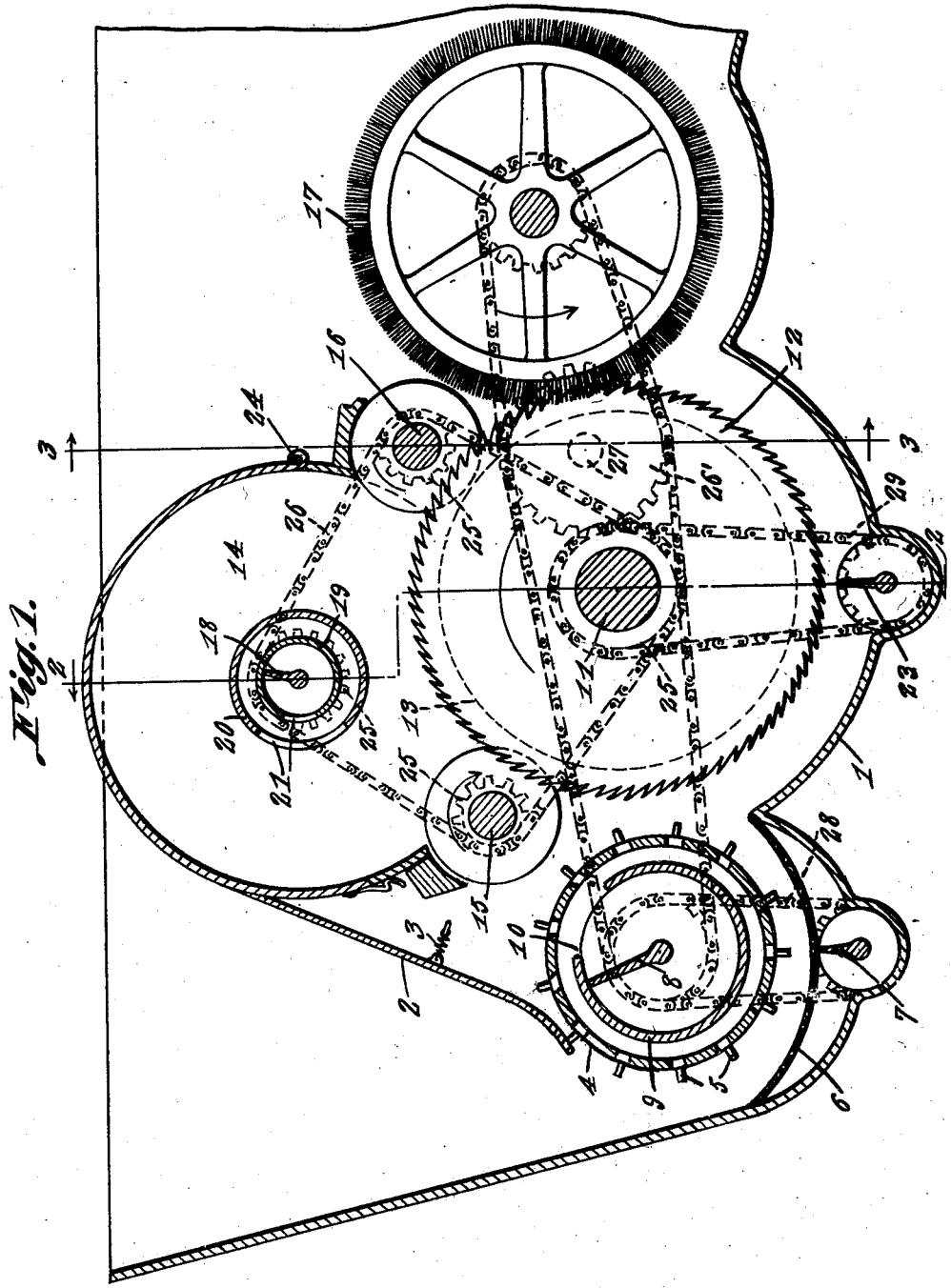
Figure 1 is a transverse sectional view through the device.
Figure 2:
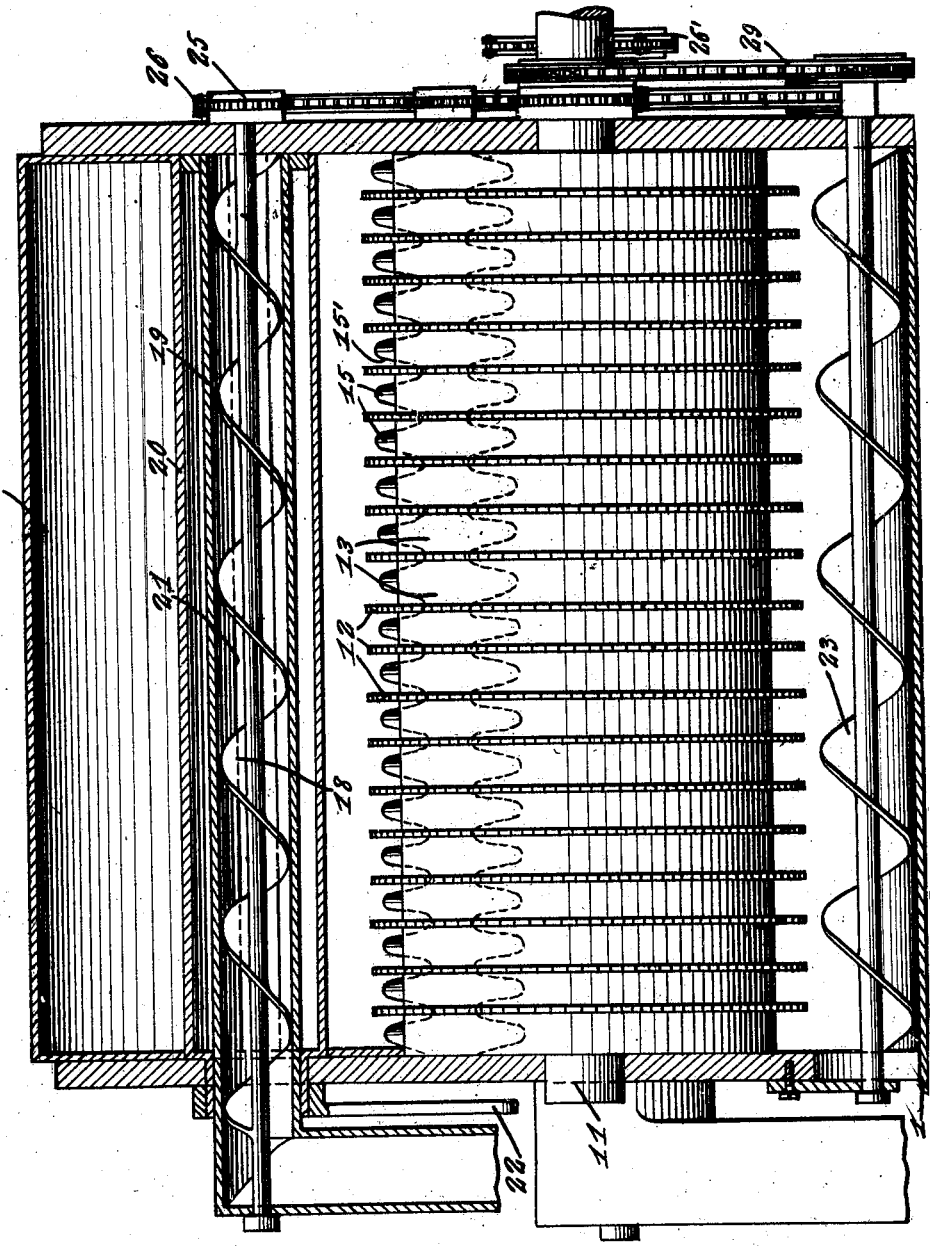
Figure 2 is a section on line 2—2 of Figure 1.

In these views, the numeral 1 indicates the casing which encloses the various parts of the device, a movable baffle plate 2 controlled by a spring 3, dividing the front portion of the casing into a hopper to receive the material to be treated by the apparatus. A reel 4 is rotatably mounted in the lower part of the casing under the plate with its projections 5 arranged to contact the lower edge of the plate during the rotation of the reel. A screen 6 is arranged under the reel so that trash and the like will pass through the same and this trash will be conveyed from the casing by the conveyor auger 7 arranged in the bottom of the casing below the screen.

The hulls and the like passing through the reel will be conveyed from the device by means of the auger conveyor 8 placed in the reel, the casing 9 of which is formed with an elongated opening 10 at its top part through which the material passing through the reel enters the casing 9 where it is engaged by the auger.

The saw shaft is shown at 11 and carries a plurality of saws 12 which are spaced apart by the circular blocks 13. A casing or box 14 is arranged above the saws with the upper portions of the saws entering the lower part of the box and a huller roll 15 is arranged at the front side of the box between its lower front edge and the saws. This roll is corrugated, as shown at 15', with the saws passing through the spaces formed by the corrugations, these spaces being so formed that the cotton seeds and cotton can pass through them into the box, but hulls, burrs and the like are prevented from entering the box, this material falling back upon the reel through which it passes into the conveyor casing 9 where it is conveyed to a point exterior of the casing 1 by the conveyor 8. A roll 16 is journaled in the casing between the rear edge of the box 14 and the saws, portions of the saws entering the grooves in the roll 16 and these grooves are so formed that they prevent seeds from passing from the box 14, but permitting the lint to pass. The usual doffer brush 17 is arranged in rear of the saws for removing the lint therefrom.

An auger conveyor 18 is arranged in the longitudinal center of the box 14 and its cylinder 19 is surrounded by an outer cylinder 20, each cylinder having an opening 21 therein and said cylinder 20 is rotatably supported and is provided with a handle 22 so that by moving the cylinder 20 by its handle 22, the opening in the cylinder 19 can be adjusted or entirely closed. A conveyor auger 23 is arranged in the bottom of the casing under the saws for removing trash and the like dropping into the space below the saws and the major portion of the box is hingedly connected with another portion, as shown at 24, so that the box can be opened to permit access to the parts and removal of the material therefrom when necessary or desirable.

The shaft 11 is driven from any suitable source and sprockets 25 are arranged in this shaft and on the rolls 15 and 16 and the conveyor 18 and a chain 26 passes over these sprockets so that the rolls 15 and 16 and the conveyor 18 are driven from the shaft 11. The brush 17 and the conveyor 8, as well as the reel, are connected by sprockets and chains, shown generally at 26, with a shaft 27 which is driven from the shaft 11 and the conveyor 7 is connected by the chains and sprockets shown generally at 28, with the conveyor 8, while the conveyor 23 is connected by chains and sprockets shown generally at 29, with the shaft 11.

From the foregoing it will be seen that the material in the hopper will pass under the reel as the reel is rotating, and said reel will feed the material against the saws so that the saws will carry the material upwardly against the huller roll 15, the seeds and cotton passing into the box through the spaces formed in said roll, while hulls and the like will be prevented by the roll from entering the box and this material will drop back upon the reel and be carried by the conveyor 8 to a discharge point. The seeds in the box 14 will be acted on by the saws so that the cotton will be stripped therefrom by the saws, the seeds being held in the box by the roll 16 and the lint will be striped from the saws by the brush 17. The revolving roll 16 will act to throw the seeds and any other foreign matter in the box upwardly so that said seeds will pass into the conveyor through the openings 21 in the cylinders of the conveyor and thus be discharged at one side of the casing. With this invention, the capacity of the ginning machine is increased over the old rib type and can be operated with less power than the old type and can be constructed at less expense. It will also insure a better product.

It is thought from the foregoing description that the advantages and novel features of our invention will be readily apparent.

It is to be understood that we may make changes in the construction and in the combination and arrangement of the several parts, provided that such changes fall within the scope of the appended claims.

What we claim is:—

1. A cotton gin comprising a casing, a shaft journaled therein, a plurality of saws carried by the shaft, a box arranged above the saws with the upper portions of the saws entering the lower part of the box the front and rear edges of the box being spaced from the saws, a huller roll journaled in the casing between the front edge of the box and the saws, said roll having grooves therein for receiving the saws and permitting seeds and cotton to enter the box, while preventing hulls from entering the box, a grooved roll journaled in the casing between the rear edge of the box and the saws, the saws passing through the grooves and said grooves preventing seeds from passing from the box, conveyor means in the box for removing the stripped seeds therefrom, said conveyor including a casing having an inlet opening therein, means for regulating the size of the inlet opening, means for feeding the material to the saws and means for rotating the various parts.

2. A cotton gin comprising a casing, a shaft journaled therein, a plurality of saws carried by the shaft, a box arranged above the saws with the upper portions of the saws entering the lower part of the box, the front and rear edges of the box being spaced from the saws, a huller roll journaled in the casing between the front edge of the box and the saws, said roll having grooves therein for receiving the saws and permitting seeds and cotton to enter the box, while preventing hulls from entering the box, a grooved roll journaled in the casing between the rear edge of the box and the saws, the saws passing through the grooves and said grooves preventing the seeds from passing from the box, conveyor means in the box for removing the stripped seeds therefrom, said conveyor including a casing having an inlet opening therein, means for regulating the size of the inlet opening, a reel for feeding the material to the saws and means for rotating the various parts.

3. A cotton gin comprising a casing, a shaft journaled therein, a plurality of saws carried by the shaft, a box arranged above the saws with the upper portions of the saws entering the lower part of the box, a huller roll journaled in the casing between the front of the box and the saws, said roll having grooves therein for receiving the saws and permitting seeds and cotton to enter the box, while preventing hulls from entering the box, a grooved roll journaled in the casing between the rear of the box and the saws, the saws passing through the grooves and said grooves preventing the seeds from passing from the box, conveyor means in the box for removing the stripped seeds therefrom, means for controlling the inlet to the conveyor, a reel for feeding the material to the saws, means for rotating the various parts and a conveyor within the reel and means for rotating the same from one of the other moving parts.

4. A cotton gin comprising a casing, a shaft journaled therein, a plurality of saws carried by the shaft, a box arranged above the saws with the upper portions of the saws entering the lower part of the box, a huller roll journaled in the casing between the front of the box and the saws, said roll having grooves therein for receiving the saws and permitting seeds and cotton to enter the box while preventing hulls from entering the box, a grooved roll journaled in the casing between the rear of the box and the saws, the saws passing through the grooves and said grooves preventing the seeds from passing from the box, conveying means in the box for removing the stripped seeds therefrom, means for controlling the inlet to the conveyor, a reel for feeding the material to the saws, means for rotating the various parts, a conveyor within the reel, means for rotating the same from one of the other moving parts, a spring pressed baffle plate arranged above the reel and conveyors, one below the reel and one below the saws for conveying waste material from the casing.

In testimony whereof we affix our signatures.

WILLIAM J. PETTY.
EUGENE M. HANCOCK.